United States Patent
Seo et al.

(10) Patent No.: US 8,199,819 B2
(45) Date of Patent: Jun. 12, 2012

(54) APPARATUS AND METHOD FOR ENCODING AND DECODING MOVING PICTURE USING ADAPTIVE SCANNING

(75) Inventors: Jeong-Il Seo, Daejon (KR); Wook-Joong Kim, Daejon (KR); Kyu-Heon Kim, Daejon (KR); Kyeong-Ok Kang, Daejon (KR); Jin-Woo Hong, Daejon (KR); Yung-Lyul Lee, Seoul (KR); Ki-Hun Han, Seoul (KR); Jae-Ho Hur, Gyeonggi-do (KR); Dong-Gyu Sim, Seoul (KR); Seoung-Jun Oh, Gyeonggi-do (KR)

(73) Assignees: Electronics and Telecommunications Research Institute, Daejon (KR); Kwangwoon University Research Institute for Industry Cooperation, Seoul (KR)

( * ) Notice: Subject to any disclaimer, the term of this patent is extended or adjusted under 35 U.S.C. 154(b) by 1087 days.

(21) Appl. No.: 12/090,699

(22) PCT Filed: Oct. 19, 2006

(86) PCT No.: PCT/KR2006/004260
§ 371 (c)(1),
(2), (4) Date: Apr. 18, 2008

(87) PCT Pub. No.: WO2007/046644
PCT Pub. Date: Apr. 26, 2007

(65) Prior Publication Data
US 2008/0285644 A1   Nov. 20, 2008

(30) Foreign Application Priority Data
Oct. 21, 2005 (KR) .................. 10-2005-0099733

(51) Int. Cl.
*H04N 7/12* (2006.01)

(52) U.S. Cl. .................. 375/240.12; 375/240.03
(58) Field of Classification Search .......... 375/240.16, 375/240.12, 240.03; 382/250, 236
See application file for complete search history.

(56) References Cited

U.S. PATENT DOCUMENTS
6,173,080 B1 * 1/2001 Cho et al. .................. 382/250
(Continued)

FOREIGN PATENT DOCUMENTS
EP          0 230 632          8/1987
(Continued)

OTHER PUBLICATIONS
International Search Report mailed Jan. 26, 2007; PCT/KR2006/004260.
(Continued)

*Primary Examiner* — Kwang B Yao
*Assistant Examiner* — Syed M Bokhari
(74) *Attorney, Agent, or Firm* — Ladas & Parry LLP

(57) ABSTRACT

Provided is an apparatus and method for encoding/decoding moving pictures based on adaptive scanning. The moving picture apparatus and method can increase a compression rate based on adaptive scanning by performing intra prediction onto blocks of a predetermined size, and scanning coefficients acquired from Discrete Cosine Transform (DCT) of a residue signal and quantization differently according to the intra prediction mode. The moving picture encoding apparatus includes: a mode selector for selecting and outputting a prediction mode; a predictor for predicting pixel values of pixels to be encoded of an input video based on the prediction mode to thereby output a residue signal block; a transform/quantization unit for performing DCT onto the residue signal block and quantizing the transformed residue signal block; and an encoder for adaptively scanning and encoding the quantized residue signal block based on the prediction mode.

19 Claims, 5 Drawing Sheets

U.S. PATENT DOCUMENTS

| | | | | |
|---|---|---|---|---|
| 6,192,077 | B1 * | 2/2001 | Sugiyama | 375/240.12 |
| 2006/0215919 | A1 * | 9/2006 | Srinivasan | 382/236 |
| 2009/0028239 | A1 * | 1/2009 | Schuur et al. | 375/240.03 |
| 2009/0285302 | A1 * | 11/2009 | Kato et al. | 375/240.16 |

FOREIGN PATENT DOCUMENTS

| | | |
|---|---|---|
| EP | 1 465 431 A2 | 10/2004 |
| JP | 02-250581 A | 10/1990 |
| KR | 100135364 | 1/1998 |
| KR | 100180173 | 11/1998 |
| KR | 100234387 | 9/1999 |
| KR | 10-0309165 B1 | 9/2001 |
| KR | 1020020006149 | 1/2002 |
| KR | 1020020081342 | 10/2002 |
| KR | 2003-0026699 A | 4/2003 |
| KR | 2004-0027047 A | 4/2004 |
| KR | 1020040027047 | 4/2004 |

OTHER PUBLICATIONS

Xiaopeng Fan et al; "A Novel Coefficient Scanning Scheme For Directional Spatial Prediction-Based Image Compression", Proceedings of the 2003 International Conference on Multimedia and EXPO, vol. 2, pp. 557-560, Jul. 6, 2003.

A. Puri, et al; "Improvements in DCT Based Video Coding", Proceedings of SPIE, vol. 3024, No. Part 01, pp. 676-688, Feb. 12, 1997.

* cited by examiner

APPARATUS AND METHOD FOR ENCODING AND DECODING MOVING PICTURE USING ADAPTIVE SCANNING

TECHNICAL FIELD

The present invention relates to encoding and decoding of moving picture based on adaptive scanning; and, more particularly, to a moving picture encoding/decoding apparatus that can increase a compression rate by performing intra prediction onto blocks of a predetermined size, and adaptively scanning coefficients acquired from Discrete Cosine Transform (DCT) of a residue signal and quantization differently according to the intra prediction mode, and a method thereof.

BACKGROUND ART

According to an H.264 Standard arranged for encoding/decoding moving pictures, the encoding/decoding is performed on the basis of a unit of macro blocks or a unit of a sub-block. One frame includes a plurality of macro blocks, and the sub-block is acquired by dividing a macro block into two or four. The encoding and decoding are carried out based on temporal prediction and spatial prediction. Temporal prediction is predicting motion of the macro blocks of a current frame by referring to macro blocks of adjacent frames. Spatial prediction is predicting a macro block of a current from to be encoded based on adjacent macro blocks within the current frame.

The spatial prediction is also referred to as intra prediction. The intra predication takes advantage of a feature that adjacent pixels of a pixel to be predicted is highly likely to have a similar value. According to the H.264 Standard, a pixel value of a current block is predicted based on a prediction mode considering nine directionalities.

FIG. 1 is a view showing an intra prediction mode for 4×4 blocks and 8×8 blocks in the H.264. There are nine prediction modes according to the prediction direction: a vertical mode (mode 0), a horizontal mode (mode 1), a DC mode (mode 2), a Diagonal_Down_Left mode (mode 3), a Diagonal_Down_Right mode (mode 4), a Vertical_Right mode (mode 5), a Horizontal_Down mode (mode 6), a Vertical_Left mode (mode 7), and a Horizontal_Up mode (mode 8). The arrows signify predictional directions. Hereinafter, a prediction process in the vertical mode and the horizontal mode will be described, when intra prediction is performed onto 4×4 blocks.

FIG. 2 is a view for describing a pixel prediction in the horizontal mode. As shown in FIG. 2, pixels a, e, i, and m 302, 304, 306 and 308 are predicted from an adjacent pixel A in the vertical direction. In the same way, pixels b, f, j and n are predicted from a pixel B, and pixels c, g, k and o are predicted from a pixel C, while pixels d, h, l and p are predicted from a pixel D.

FIG. 3 is a view for describing a pixel prediction process in the horizontal mode. As shown in FIG. 3, pixels a, b, c and d 312, 314, 316 and 318 are predicted from an adjacent pixel I in the horizontal direction. In the same way, pixels e, f, g and h are predicted from a pixel J, and i, j, k and l are predicted from a pixel K pixels, while pixels m, n, o and p are predicted from a pixel L.

Meanwhile, a conventional moving picture encoder performs entropy encoding by performing Discrete Cosine Transform (DCT) and quantization onto a residue signal, which is obtained by differentially dividing a predicted signal and a current signal, to thereby produce a coefficient and performing zigzag scanning onto the coefficient.

However, the correlation of the residue signal is likely to be high in a horizontal direction or a vertical direction according to whether the prediction mode is a horizontal mode or a vertical mode. Therefore, the conventional encoding method using a fixed zigzag scanning has a drawback that it is not appropriate for acquiring a high compression rate.

DISCLOSURE

Technical Problem

It is, therefore, an object of the present invention to provide a moving picture encoding apparatus and method that can increase a compression rate based on adaptive scanning by performing intra prediction onto blocks of a predetermined size, and adaptively scanning a coefficient acquired from Discrete Cosine Transform (DCT) of a residue signal and quantization according to the intra prediction mode, and a decoding apparatus and method therefor.

Technical Solution

In accordance with one aspect of the present invention, there is provided an apparatus for encoding moving picture based on adaptive scanning, which includes: a mode selecting means for selecting and outputting a prediction mode; a predicting means for predicting pixel values of pixels to be encoded of an input video based on the prediction mode to thereby output a residue signal block; a transform/quantization means for performing Discrete Cosine Transform (DCT) onto the residue signal block and quantizing the transformed residue signal block; and an encoding means for adaptively scanning and encoding the quantized residue signal block based on the prediction mode.

In accordance with another aspect of the present invention, there is provided an apparatus for decoding moving picture based on adaptive scanning, which includes: an entropy decoder for receiving encoded bitstream, decoding the encoded bitstream based on an entropy decoding method, and outputting decoded signals; a scanning method detector for receiving the decoded signals from the entropy decoder, acquiring a scanning method used in the encoding of the decoded signals, and outputting the scanning method information along with the decoded signals; and a video recovering unit for recovering the decoded signals based on the scanning method and outputting a recovered video, wherein the scanning method is an adaptive scanning where different scanning methods are applied based on an intra prediction mode.

In accordance with another aspect of the present invention, there is provided a method for encoding moving pictures based on adaptive scanning, which includes the steps of: a) selecting a prediction mode; b) predicting pixel values of pixels to be encoded of an input video based on the selected prediction mode and outputting a residue signal block; c) performing Discrete Cosine Transform (DCT) onto the residue signal block and quantizing the transformed residue signal block; d) adaptively scanning the quantized residue signal block based on the prediction mode and outputting scanned coefficients; and e) encoding the scanned coefficients.

Advantageous Effects

The present invention can improve an encoding compression rate remarkably by performing intra prediction onto blocks of a predetermined size, and adaptively scanning coefficients acquired from Discrete Cosine Transform (DCT) of a residue signal and quantization differently according to the intra prediction mode, and a method thereof.

DESCRIPTION OF DRAWINGS

The above and other objects and features of the present invention will become apparent from the following description of the preferred embodiments given in conjunction with the accompanying drawings, in which.

BEST MODE FOR THE INVENTION

Figure 1:
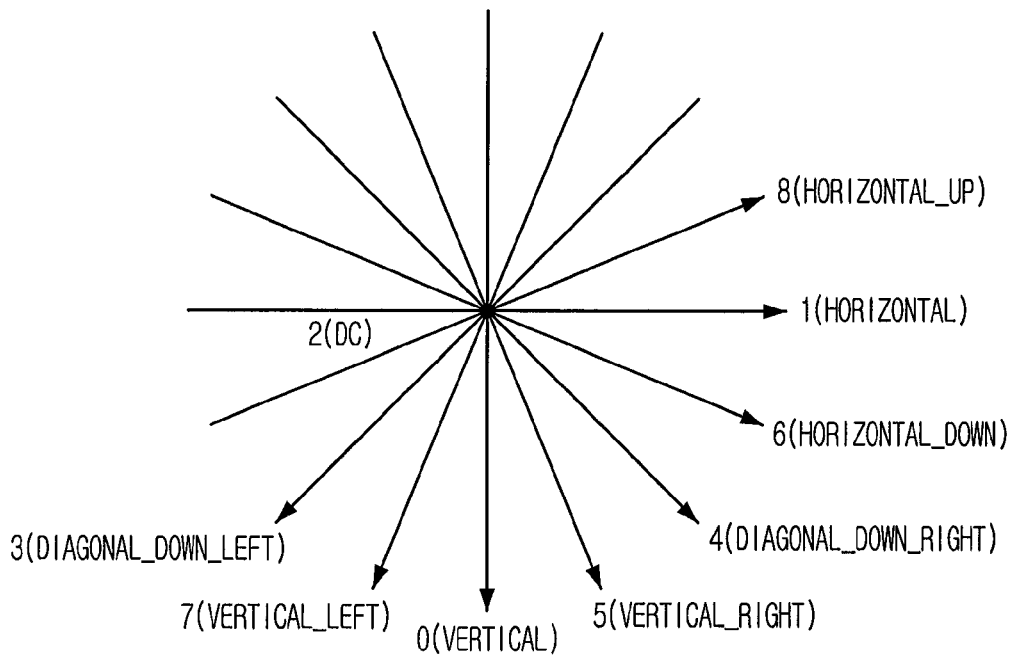
FIG. 1 is a view showing an intra prediction mode for 4×4 blocks and 8×8 blocks in H.264.
Figure 2:
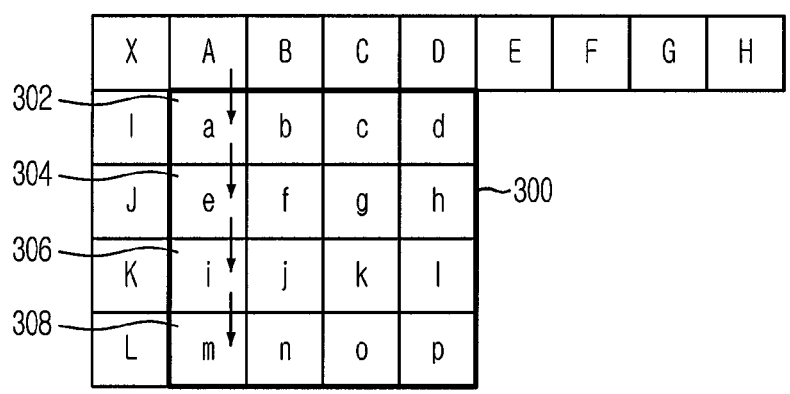
FIG. 2 is a view describing a pixel prediction process in a vertical mode.
Figure 3:
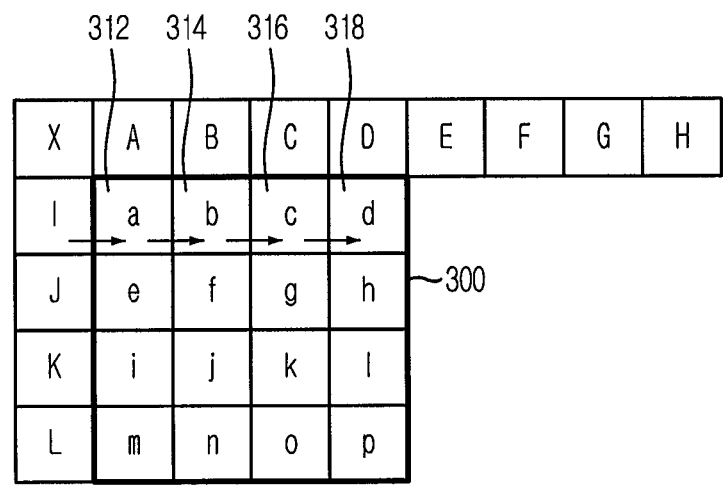
FIG. 3 is a view describing a pixel prediction process in a horizontal mode.

Following description exemplifies only the principles of the present invention. Even if they are not described or illustrated clearly in the present specification, one of ordinary skill in the art can embody the principles of the present invention and invent various apparatuses within the concept and scope of the present invention. The use of the conditional terms and embodiments presented in the present specification are intended only to make the concept of the present invention understood, and they are not limited to the embodiments and conditions mentioned in the specification.

In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

Other objects and aspects of the invention will become apparent from the following description of the embodiments with reference to the accompanying drawings, which is set forth hereinafter. When it is thought that detailed description on a prior art may obscure the points of the invention, the description will not be provided herein. Herein, preferred embodiments of the present invention will be described in detail with reference to the accompanying drawings.

Figure 4:
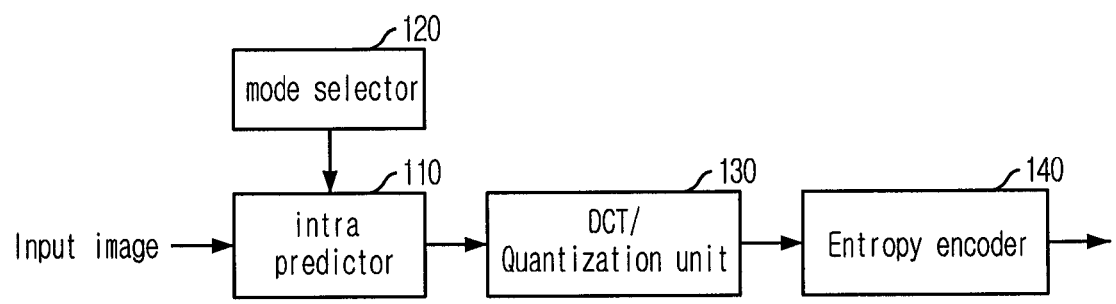
FIG. 4 is a block view illustrating a moving picture encoding apparatus in accordance with an embodiment of the present invention.

FIG. 4 is a block view illustrating a moving picture encoding apparatus in accordance with an embodiment of the present invention.

As shown in FIG. 4, the moving picture encoding apparatus includes an intra predictor 110, a mode selector 120, a Discrete Cosine Transform (DCT)/quantization unit 130, and an entropy coding unit 140.

The mode selector 120 selects an optimal prediction mode among the aforementioned intra prediction modes and outputs it to the intra predictor 110. In other words, the mode selector 120 selects one among diverse encoding prediction modes available during 4×4 intra prediction, 16×16 intra prediction and 8×8 intra prediction. Generally, it selects one prediction mode based on rate-distortion optimization.

In case of luminance blocks, the prediction modes include a vertical mode, a horizontal mode, a DC mode, a Diagonal_Down_Left mode, a Diagonal_Down_Right mode, a Vertical_Right mode, a Horizontal_Down mode, a Vertical_Left mode, and a Horizontal_Up mode, which are intra 4×4 luminance encoding modes of the H.264, and a vertical mode, a horizontal mode, a plane mode and a DC mode, which are intra 16×16 luminance encoding modes.

With respect to chrominance blocks, the prediction modes include a vertical mode, a horizontal mode, a plane mode and a DC mode, which are intra M×N chrominance encoding modes of the H.264.

The intra predictor 110 performs prediction on an input image according to the prediction mode inputted from the mode predictor 120 and outputs a residue signal block which represents a difference between the pixel value of a macro block of a current frame to be encoded and a predicted pixel value. In the present embodiment, 4×4 intra prediction is performed onto the pixels of a luminance block, and 8×8 intra prediction is performed onto the pixels of a chrominance block.

The DCT/quantization unit 130 performs DCT and quantization onto the residue signal block inputted from the intra predictor 110 and outputs it to the entropy encoder 140.

The entropy encoder 140 arranges coefficients by adaptively scanning the quantized residue signal block regardless of the kind of the prediction mode, performs entropy encoding, and outputs encoded signals. The entropy encoding is an encoding method which increases the data compression rate by allocating a few bits to data with a high occurrence frequency number and many bits to data with a low occurrence frequency number. The entropy encoding that may be applied to the present invention includes context adaptive variable length coding (CAVLC) and context-based adaptive binary arithmetic coding (CABAC).

Figure 5:
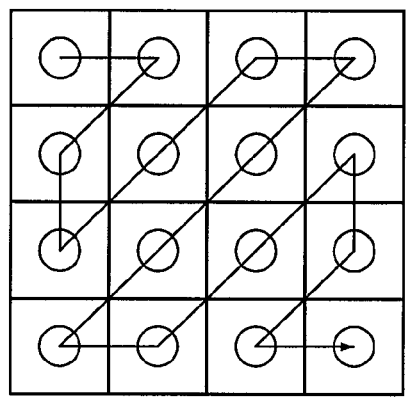
FIG. 5 is a view showing a conventional zigzag scanning.

FIG. 5 is a view describing a conventional zigzag scanning. The conventional zigzag scanning of FIG. 5 is devised in consideration that a significant coefficient of DCT is highly likely to be positioned in the left upper part. However, when the vertical mode or a horizontal mode is selected as an intra prediction mode, the correlation property of the residue signal may increase in a vertical or a horizontal direction. In the case of the vertical mode, the significant coefficient mainly appears around a first row. And, in the case of the horizontal mode, the significant coefficient mainly appears around a first column. Therefore, another scanning method that can replace the conventional zigzag scanning is required. Hereinafter, embodiments of adaptive scanning will be described according to the kinds of the intra prediction mode.

Figure 6:
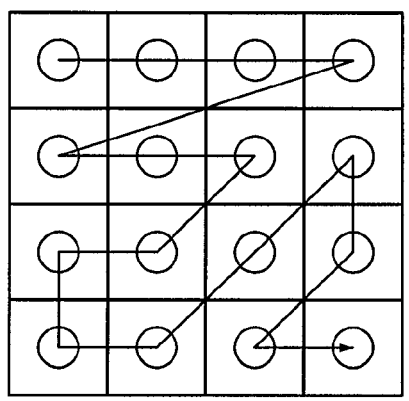
FIG. 6 is a view showing a horizontal preference scanning in accordance with an embodiment of the present invention.
Figure 7:
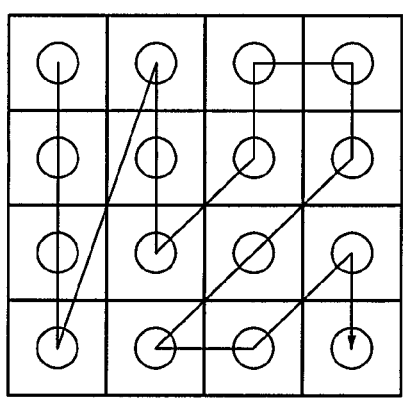
FIG. 7 is a view showing a vertical preference scanning in accordance with an embodiment of the present invention.

FIG. 6 is a view showing a horizontal preference scanning in accordance with an embodiment of the present invention, and FIG. 7 is a view showing a vertical preference scanning in accordance with an embodiment of the present invention.

According to the embodiment of the present invention, the entropy encoder 140 uses the horizontal preference scanning method shown in FIG. 6, when the intra prediction mode is a vertical mode. When the intra prediction mode is a horizontal mode, the entropy encoder 140 uses the vertical preference scanning method shown in FIG. 7. In the other cases, the entropy encoder 140 uses the conventional zigzag scanning, arranges coefficients, performs entropy encoding, and outputs encoded signals.

According to the horizontal preference scanning method illustrated in FIG. 6, all the blocks of the first row are scanned and then the subsequent scanning is performed in a sequence from all the blocks of the first row, followed by the first to third blocks in the second row, the second block and the first block in the third row, the first and second blocks in the fourth row, the third block in the third row, the fourth block in the second row, the fourth block in the third row, and the third and fourth blocks in the fourth row. Therefore, since the horizontal preference scanning of the present invention scans all the blocks in the first row prior to the other rows, it has a high correlation in the row direction and it is appropriate for the vertical mode where the significant coefficients are mainly positioned in around the first row.

According to the vertical preference scanning described in FIG. 7, scanning is performed in a sequence from all the blocks in the first column first, followed by the first to third blocks in the second column, the second block and the first block in the third column, the first and second blocks in the fourth column, the third block in the third column, the fourth block in the second column, the fourth block in the third column, and the third and fourth blocks in the fourth column. Therefore, the vertical preference scanning of the present invention has a high correlation in the column direction and it is appropriate for the vertical mode where the significant coefficients are mainly positioned in around the first column.

Since the present invention determines the scanning method to be applied based on the intra mode, it scarcely affects the existing syntax and the apparatus of the present invention can be realized by applying a little modification to the semantics of a scanning method in the encoding and decoding. Since those skilled in the art of a moving picture encoding/decoding technology such as the H.264 can easily realize the adaptive scanning based on an intra prediction mode, which is suggested in the present invention, detailed description on it will not be provided herein.

Figure 8:
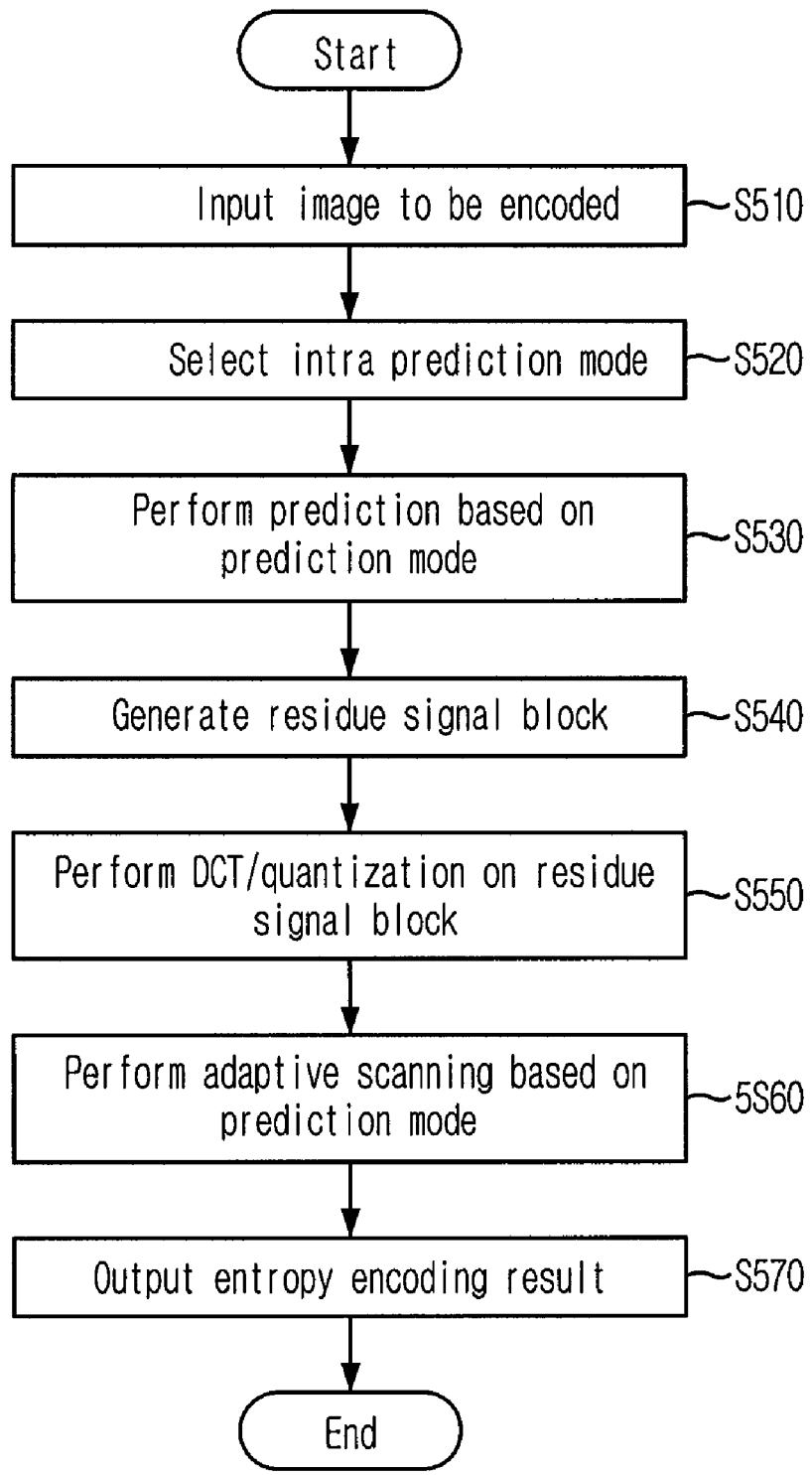
FIG. 8 is a flowchart describing a moving picture encoding method using adaptive scanning in accordance with an embodiment of the present invention.

FIG. 8 is a flowchart describing a moving picture encoding method using adaptive scanning in accordance with an embodiment of the present invention.

First, when an image to be encoded is inputted to the intra predictor 110 at step S510, the mode selector 120 selects an intra prediction mode at step S520.

Subsequently, the intra predictor 110 performs prediction onto the inputted image based on the selected prediction mode at step S530, and creates a residue signal block having a difference value between a pixel value in a macro block of a current frame to be encoded and a predicted pixel value at step S540.

At step S550, the DCT/quantization unit 130 performs DCT onto the residue signal block and quantizes the transformed residue signal block.

Subsequently, the entropy encoder 140 adaptively scans the quantized residue signal block based on the prediction mode at step S560, performs entropy encoding onto the scanned coefficient, and outputs the entropy-encoded coefficient at step S570.

Figure 9:
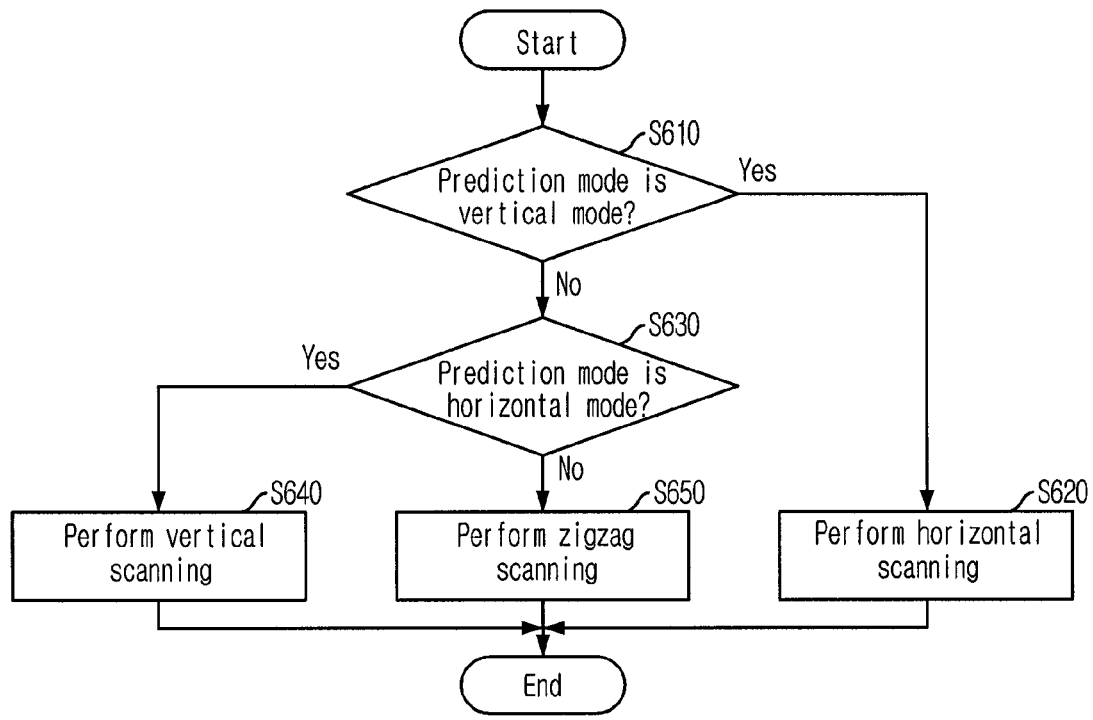
FIG. 9 is a flowchart describing an adaptive scanning in accordance with an embodiment of the present invention.

FIG. 9 is a flowchart describing an adaptive scanning in accordance with an embodiment of the present invention. First, it is determined at step S610 whether the prediction mode is a vertical mode. When it is determined that the prediction mode is the vertical mode, horizontal preference scanning is performed at step S620. Meanwhile, when the prediction mode is not the vertical mode, it is determined at step S630 whether the prediction mode is a horizontal mode.

When the prediction mode is the horizontal mode, vertical preference scanning is carried out at step S640. When it is not the horizontal mode, zigzag scanning is carried out at step S650.

Figure 10:
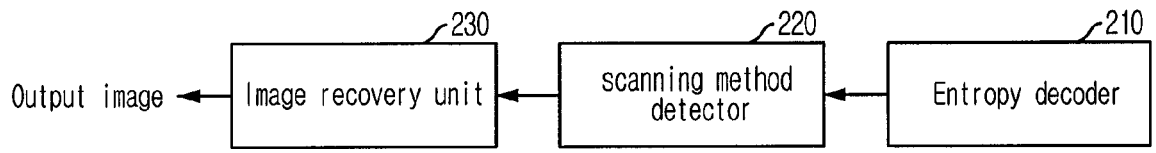
FIG. 10 is a block view illustrating a moving picture decoding apparatus in accordance with an embodiment of the present invention.

FIG. 10 is a block view illustrating a moving picture decoding apparatus in accordance with an embodiment of the present invention.

As illustrated in FIG. 10, the moving picture decoding apparatus of the present invention includes an entropy decoder 210, a scanning method detector 220, and an image recovery unit 230.

The entropy decoder 210 receives encoded bitstream and decodes it by using an entropy decoding method such as Context Adaptive Variable Length Coding (CAVLC) and Context-based Adaptive Binary Arithmetic Coding (CABAC).

The scanning method detector 220 receives the decoded signal from the entropy decoder 210, acquires information on how the decoded signal was scanned in the encoding process, and transmits the scanning method information to the image recovery unit 230 along with the decoded signal.

The image recovery unit 230 recovers the decoded signal based on the scanning method and outputs a recovered image.

TABLE 1

|  | News (QCIF) | Container (QCIF) | Foreman (QCIF) | Silent (QCIF) | Paris (CIF) | Mobile (CIF) | Tempete (CIF) |
| --- | --- | --- | --- | --- | --- | --- | --- |
| Entire Frame | 100 (30 Hz) | 100 (30 Hz) | 100 (30 Hz) | 100 (35 Hz) | 100 (30 Hz) | 100 (30 Hz) | 100 (30 Hz) |
| Condition | CABAC, Intra only(Intra4 × 4 mode), QP(25, 30, 35, 40) | | | | | | |

As shown in the Table 1, seven images of different sizes were tested.

The following Table 2 compares compression rates, when the test images are encoded based on the encoding method using the adaptive scanning and the conventional encoding method using the H.264 zigzag scanning under the aforementioned experimental conditions.

TABLE 2

| Image | QP | JM96 PSNR(dB) | JM96 Bits | Proposed PSNR(dB) | Proposed Bits | Bits Reduction(%) |
|---|---|---|---|---|---|---|
| Foreman | 25 | 38.98 | 3341696 | 38.98 | 3321088 | 0.60 |
|  | 30 | 35.21 | 2003064 | 35.21 | 1990384 | 0.55 |
|  | 35 | 31.74 | 1189744 | 31.73 | 1184392 | 0.34 |
|  | 40 | 28.48 | 722416 | 28.48 | 722264 | 0.11 |
| News | 25 | 40.12 | 3448504 | 40.13 | 3381512 | 1.94 |
|  | 30 | 35.95 | 2265968 | 35.96 | 2230296 | 1.57 |
|  | 35 | 31.99 | 1434256 | 31.99 | 1406384 | 1.94 |
|  | 40 | 28.40 | 883904 | 28.42 | 875368 | 0.97 |
| Silent | 25 | 38.97 | 3621240 | 38.97 | 3601360 | 0.55 |
|  | 30 | 34.97 | 2091720 | 34.96 | 2076720 | 0.81 |
|  | 35 | 31.56 | 1182280 | 31.56 | 1180416 | 0.16 |
|  | 40 | 28.46 | 669544 | 28.46 | 672696 | −0.38 |
| Container | 25 | 39.51 | 3287920 | 39.51 | 3260584 | 0.88 |
|  | 30 | 35.68 | 2058192 | 35.69 | 2029224 | 1.44 |
|  | 35 | 32.05 | 1247248 | 32.04 | 1219000 | 2.12 |
|  | 40 | 28.54 | 745848 | 28.54 | 730344 | 2.26 |
| Paris | 25 | 39.21 | 17437120 | 39.20 | 17165032 | 1.56 |
|  | 30 | 34.99 | 11376816 | 34.99 | 11167040 | 1.84 |
|  | 35 | 31.10 | 7078352 | 31.11 | 6950384 | 1.84 |
|  | 40 | 27.50 | 4254824 | 27.52 | 4180808 | 1.61 |
| Mobile | 25 | 38.42 | 27515248 | 38.42 | 27301888 | 0.80 |
|  | 30 | 33.75 | 18700976 | 33.74 | 18538960 | 0.89 |
|  | 35 | 29.45 | 11923256 | 29.44 | 11821040 | 0.89 |
|  | 40 | 25.62 | 7179088 | 25.63 | 7126328 | 0.73 |
| Tempete | 25 | 38.77 | 19968328 | 38.76 | 19748304 | 1.10 |
|  | 30 | 34.33 | 12766256 | 34.33 | 12605288 | 1.25 |
|  | 35 | 30.30 | 7623776 | 30.30 | 7525136 | 1.28 |
|  | 40 | 26.73 | 4278568 | 26.74 | 4244224 | 0.82 |
| Average | 25 |  |  |  |  | 1.06 |
|  | 30 |  |  |  |  | 1.19 |
|  | 35 |  |  |  |  | 1.23 |
|  | 40 |  |  |  |  | 0.88 |

It can be seen from the Table 2 that the encoding compression rate using the adaptive scanning based on the intra prediction mode according to the present invention is superior to the encoding compression rate using the H.264 zigzag scanning.

Meanwhile, a video compression standard to be developed following the H.264 is expected to use only the vertical, horizontal, DC, and diagonal prediction modes, because the existing 9-directional intra prediction mode requires a considerable complexity. Therefore, the encoding method using the adaptive scanning of the present embodiment provides even more improvement in the compression rate to thereby save bits about 3%.

Meanwhile, the moving picture encoding/decoding method described above may be authored in the form of a computer program. The codes and code segments that form the program may be easily inferred by computer programmers of the art to which the present invention pertains. Also, the program is stored in a computer-readable recording medium and it can be read and executed by a computer to realize the moving picture encoding/decoding method. The data storage media include magnetic recording media, optical recording media, and carrier wave media.

While the present invention has been described with respect to certain preferred embodiments, it will be apparent to those skilled in the art that various changes and modifications may be made without departing from the scope of the invention as defined in the following claims.

What is claimed is:

1. An apparatus for encoding moving picture based on adaptive scanning, comprising:
a mode selecting means for selecting and outputting a prediction mode;
a predicting means for predicting pixel values of pixels to be encoded of an input video based on the prediction mode to thereby output a residue signal block;
a transform/quantization means for transforming the residue signal block and quantizing the transformed residue signal block; and
an encoding means for adaptively scanning and encoding the transformed and quantized residue signal block based on the prediction mode,
wherein the encoding means executes a horizontal preference scanning when the prediction mode is a vertical mode and executes a vertical preference scanning when the prediction mode is a horizontal mode.

2. The encoding apparatus as recited in claim 1, wherein coefficients of a first row in the transformed and quantized residue signal block are scanned with priority when the encoding means executes the vertical preference scanning.

3. The encoding apparatus as recited in claim 1, wherein coefficients of a first column in the transformed and quantized residue signal block are scanned with priority when the encoding means executes the horizontal preference scanning.

4. The encoding apparatus as recited in claim 1, wherein when the prediction mode is neither the vertical mode nor the horizontal mode, the encoding means executes a zigzag scanning.

5. The encoding apparatus as recited in claim 1, wherein the encoding means performs entropy encoding onto coefficients acquired and arrayed by performing adaptive scanning based on the prediction mode.

6. The encoding apparatus as recited in claim 1, wherein horizontal preference scanning comprises scanning all the coefficients of a first row followed by performing a horizontal zigzag pattern of scanning on the remaining rows, and wherein vertical preference scanning comprises scanning the coefficients of a first column followed by performing a vertical zigzag pattern of scanning the remaining columns.

7. The encoding apparatus as recited in claim 6, wherein the transformed and quantized residue signal block is 4×4 block, and the horizontal zigzag pattern of scanning comprises scanning first to third coefficients in a second row, followed by second coefficient and first coefficient in a third row, followed by first and second coefficients in a fourth row, followed by third coefficient in the third row, followed by fourth coefficient in the second row, followed by fourth coefficient in the third row, and followed by third and fourth coefficients of the fourth row in the 4×4 block.

8. The encoding apparatus as recited in claim 6, wherein the transformed and quantized residue signal block is 4×4 block, and the vertical zigzag pattern of scanning comprises scanning first to third coefficients in a second column, followed by second and first coefficients in a third column, followed by first and second coefficients in a fourth column, followed by third coefficient in the third column, followed by fourth coefficient in the second column, followed by fourth coefficient in the third column, and followed by third and fourth coefficients in the fourth column in the 4×4 block.

9. An apparatus for decoding moving picture based on adaptive scanning, comprising:
 an entropy decoder for receiving encoded bitstream, decoding the encoded bitstream based on an entropy decoding method, and outputting decoded signals;
 a scanning method detector for receiving the decoded signals from the entropy decoder, acquiring information on a scanning method for the decoded signals, and outputting the scanning method information along with the decoded signals; and
 a video reconstructing unit for reconstructing the decoded signals based on the scanning method and outputting a image reconstructed with the decoded signal,
 wherein the scanning method depends on the prediction mode used for the decoded signals, and
 the video reconstructing unit reconstructs the decoded signals with a horizontal preference scanning when the prediction mode is a vertical mode and reconstructs the decoded signals with a vertical preference scanning when the prediction mode is a horizontal mode.

10. The decoding apparatus as recited in claim 9, wherein the video reconstructing unit reconstructs the decoded signals by scanning a first row of the decoded signals with priority when the prediction mode is a vertical mode.

11. The decoding apparatus as recited in claim 9, wherein the video reconstructing unit reconstructs the decoded signals by scanning a first column of the decoded signals with priority when the prediction mode is a horizontal mode.

12. The decoding apparatus as recited in claim 9, wherein when the prediction mode is neither the vertical mode nor the horizontal mode, the video reconstructing unit reconstructs the decoded signals by executing a zigzag scanning.

13. A method for encoding moving pictures based on adaptive scanning, comprising the steps of:
 a) selecting a prediction mode;
 b) predicting pixel values of pixels to be encoded of an input video based on the selected prediction mode and outputting a residue signal block;
 c) transforming the residue signal block and quantizing the transformed residue signal block;
 d) adaptively scanning the transformed and quantized residue signal block based on the prediction mode and outputting scanned coefficients; and
 e) encoding the scanned coefficients,
 wherein the adaptively scanning step d) includes the steps of:
  d1) executing horizontal preference scanning when the prediction mode is a vertical mode; and
  d2) executing vertical preference scanning when the prediction mode a horizontal mode.

14. The encoding method as recited in claim 13, wherein executing horizontal preference scanning d1) includes:
 scanning coefficients of a first row in the transformed and quantized residual signal block with priority when the horizontal preference scanning is executed.

15. The encoding method as recited in claim 13, executing vertical preference scanning includes:
 scanning coefficients of a first column in the transformed and quantized residual signal block with priority when the vertical preference scanning is executed.

16. The encoding method as recited in claim 15, wherein the adaptively scanning step d) further includes the step of:
 d3) performing zigzag scanning when the prediction mode is neither the vertical mode nor the horizontal mode.

17. A method for decoding moving pictures based on adaptive scanning, comprising the steps of:
 a) performing entropy scanning method of the encoded bit stream which is entropy-decoded signal;
 b) determining a scanning method for the decoded signals which are entropy-decoded in the step a); and
 c) reconstructing the entropy-decoded signal according to the scanning method and outputting reconstructed image,
 wherein the reconstructing set c) includes reconstructing the entropy-decoded signals with a horizontal preference scanning when the prediction mode determined in the step b) is a vertical mode and reconstructing the entropy-decoded signals with a vertical preference scanning when the prediction mode determined in the step b) is a horizontal mode.

18. The method as recited in claim 17, wherein the decoded signals are reconstructed by scanning a first row of the entropy-decoded signals with priority when the predictionmode a vertical mode; and
 the entropy-decoded signals are reconstructed by scanning a first column of the entropy-decoded signals with priority when the prediction mode is a horizontal mode.

19. The method as recited in claim 17, wherein the entropy-decoded signals are reconstructed by executing a zigzag scanning when the scanning method determined in step b) is neither the vertical mode nor the horizontal mode.

* * * * *